(12) United States Patent
Klomberg et al.

(10) Patent No.: US 11,312,219 B2
(45) Date of Patent: Apr. 26, 2022

(54) CHASSIS COMPONENTS, VEHICLE BATTERY SYSTEM INTEGRALLY FORMED WITH CHASSIS COMPONENTS, AND INTEGRATED BATTERY SYSTEM VEHICLE COMPRISING SAME

(71) Applicant: Samsung SDI Co., Ltd., Yongin-si (KR)

(72) Inventors: Stephan Klomberg, Graz (AT); Nikolaus Hochgatterer, Graz (AT); Rainer Retter, Unterfladnitz (AT); Ralph Wuensche, Graz (AT)

(73) Assignee: SAMSUNG SDI CO., LTD., Yongin-si (KR)

( * ) Notice: Subject to any disclaimer, the term of this patent is extended or adjusted under 35 U.S.C. 154(b) by 246 days.

(21) Appl. No.: 16/475,363

(22) PCT Filed: Jan. 4, 2018

(86) PCT No.: PCT/KR2018/000159
§ 371 (c)(1),
(2) Date: Jul. 1, 2019

(87) PCT Pub. No.: WO2018/128404
PCT Pub. Date: Jul. 12, 2018

(65) Prior Publication Data
US 2021/0129651 A1    May 6, 2021

(30) Foreign Application Priority Data

Jan. 5, 2017   (EP) .................................. 17150397
Jan. 3, 2018   (KR) ....................... 10-2018-0000816

(51) Int. Cl.
*B60J 7/00*       (2006.01)
*B60K 1/04*       (2019.01)
(Continued)

(52) U.S. Cl.
CPC ............... *B60K 1/04* (2013.01); *B62D 25/20* (2013.01); *B60K 2001/005* (2013.01); *B60K 2001/0438* (2013.01)

(58) Field of Classification Search
CPC ..... Y02T 10/70; Y02T 10/64; Y02T 10/7072; Y02T 10/72; B60L 50/52;
(Continued)

(56) References Cited

U.S. PATENT DOCUMENTS 5,225,760 A * 7/1993 Leiserson ............. H01M 50/50
320/112
5,373,910 A * 12/1994 Nixon ..................... B60L 58/18
180/65.1
(Continued)

FOREIGN PATENT DOCUMENTS

CN      101326657 A     12/2008
CN      105938882 A      9/2016
(Continued)

OTHER PUBLICATIONS

European Patent Office Action for corresponding European Patent Application No. 17 150 397.2, dated Jul. 3, 2020, 6 pages.
(Continued)

*Primary Examiner* — Kiran B Patel
(74) *Attorney, Agent, or Firm* — Lewis Roca Rothgerber Christie LLP

(57) ABSTRACT

The present invention relates to a vehicle body part including a battery system carrier integrally formed in a vehicle body to include a plurality of battery cells, a vehicle battery system integrally with the vehicle body part, and an integrated battery system vehicle including the same.

15 Claims, 9 Drawing Sheets

(51) Int. Cl.
*B62D 25/20* (2006.01)
*B60K 1/00* (2006.01)

(58) Field of Classification Search
CPC ....... H01L 2924/00014; H01L 2924/00; H01L 2224/48091; Y02E 60/10
See application file for complete search history.

(56) References Cited

U.S. PATENT DOCUMENTS

| | | | | |
|---|---|---|---|---|
| 5,432,017 | A * | 7/1995 | Hassemer | H01M 10/0436 429/4 |
| 5,477,936 | A * | 12/1995 | Sugioka | B60L 53/22 180/68.5 |
| 5,555,950 | A * | 9/1996 | Harada | H01M 50/20 180/65.1 |
| 6,068,946 | A * | 5/2000 | Zedell, Jr. | H01M 50/10 429/100 |
| 6,227,322 | B1 | 5/2001 | Nishikawa | |
| 6,326,766 | B1 * | 12/2001 | Small | H02J 7/0045 320/112 |
| 6,753,671 | B1 * | 6/2004 | Harvey | H02J 7/0047 320/107 |
| 8,469,129 | B2 * | 6/2013 | Mildner | B60L 53/80 180/68.5 |
| 9,566,954 | B2 * | 2/2017 | Moskowitz | B60L 58/12 |
| 10,549,729 | B2 * | 2/2020 | Moskowitz | B60L 53/50 |
| 10,611,408 | B2 * | 4/2020 | Fritz | B62D 21/09 |
| 10,886,513 | B2 * | 1/2021 | Stephens | B60K 1/04 |
| 2007/0087266 | A1 | 4/2007 | Bourke et al. | |
| 2009/0145676 | A1 * | 6/2009 | Takasaki | H01M 50/20 180/65.1 |
| 2009/0186266 | A1 * | 7/2009 | Nishino | H01M 50/20 429/120 |
| 2010/0181129 | A1 * | 7/2010 | Hamidi | B60L 53/80 180/68.5 |
| 2012/0298433 | A1 | 11/2012 | Ohkura | |
| 2014/0158444 | A1 | 6/2014 | Han et al. | |
| 2014/0166381 | A1 | 6/2014 | Ling et al. | |
| 2014/0178736 | A1 | 6/2014 | Gandhi et al. | |
| 2016/0257219 | A1 * | 9/2016 | Miller | B60L 50/66 |
| 2018/0013105 | A1 * | 1/2018 | Wuensche | H01M 50/256 |
| 2018/0013110 | A1 * | 1/2018 | Wuensche | H01M 10/613 |
| 2018/0013111 | A1 * | 1/2018 | Wuensche | B60K 6/28 |
| 2018/0013113 | A1 * | 1/2018 | Wuensche | H01M 10/6556 |
| 2018/0026243 | A1 * | 1/2018 | Stojanovic | H01M 50/20 429/99 |
| 2018/0034117 | A1 * | 2/2018 | Bang | H01M 10/625 |
| 2018/0062228 | A1 * | 3/2018 | Wuensche | H01M 50/20 |
| 2019/0296294 | A1 * | 9/2019 | Hirschbeck | H01M 50/20 |
| 2020/0175551 | A1 * | 6/2020 | Penilla | B60S 5/06 |
| 2021/0031608 | A1 * | 2/2021 | Choi | H01M 50/20 |
| 2021/0098765 | A1 * | 4/2021 | Weinberger | H01M 10/6553 |
| 2021/0119282 | A1 * | 4/2021 | Wunsche | H01M 50/207 |
| 2021/0129684 | A1 * | 5/2021 | Wuensche | H01M 50/244 |

FOREIGN PATENT DOCUMENTS

| | | |
|---|---|---|
| EP | 2 623 353 A1 | 8/2013 |
| EP | 3 070 780 A1 | 9/2016 |
| EP | 3 331 055 A1 | 6/2018 |
| JP | 2012-503470 A | 2/2012 |
| JP | 2012-248299 A | 12/2012 |
| JP | 2013-125617 A | 6/2013 |
| KR | 10-2011-0081607 A | 7/2011 |
| KR | 10-2013-0068985 A | 6/2013 |
| KR | 10-2013-0140245 A | 12/2013 |
| KR | 10-2014-0083553 A | 7/2014 |
| KR | 10-2016-0111231 A | 9/2016 |
| WO | WO 2010/033881 A1 | 3/2010 |

OTHER PUBLICATIONS

Extended Search Report for corresponding European Patent Application No. 17150397.2, dated Jun. 23, 2017, 11pp.
Chinese Office action issued in corresponding application No. CN 201880005767.X, dated Mar. 2, 2022, 8 pages.

* cited by examiner

CHASSIS COMPONENTS, VEHICLE BATTERY SYSTEM INTEGRALLY FORMED WITH CHASSIS COMPONENTS, AND INTEGRATED BATTERY SYSTEM VEHICLE COMPRISING SAME

CROSS-REFERENCE TO RELATED APPLICATION(S)

This application is a National Phase Patent Application of International Patent Application Number PCT/KR2018/000159, filed on Jan. 4, 2018, which claims priority of European Patent Application No. 17150397.2, filed Jan. 5, 2017 and Korean Patent Application No. 10-2018-0000816, filed Jan. 3, 2018. The entire contents of all of which are incorporated herein by reference.

TECHNICAL FIELD

The present disclosure relates to a vehicle body part and a vehicle battery system integrally formed with the vehicle body part.

The present disclosure also relates to an integrated battery system vehicle including the battery system.

BACKGROUND ART

A rechargeable battery differs from a primary battery in that it can repeatedly perform charging and discharging, while the primary battery only performs non-reversible conversion from chemical energy into electrical energy. A low-capacity rechargeable battery is used as a power source for small electronic devices such as portable telephones, laptops computers, and camcorders, and a high-capacity rechargeable battery is used as a power source for vehicles.

In general, the rechargeable battery may include an electrode assembly including a positive electrode, a negative electrode, and a separator interposed between the positive electrode and the negative electrode, a case for accommodating the electrode assembly therein, and an electrode terminal electrically connected to the electrode assembly. An electrolyte solution is injected therein to enable charging and discharging of the battery through an electrochemical reaction of a positive electrode, a negative electrode, and the electrolyte solution. The case has, e.g., a cylindrical shape or a rectangular shape, but may have a different shape depending on the use of the battery.

A battery module including a plurality of unit battery cells connected in series and/or in parallel is used to provide desired energy. The battery module is formed by interconnecting electrode terminals of the unit battery cells, and a number of the unit battery cells varies depending on a required amount of power.

The battery module may be configured in a block design or a module design. In the case of the block design, each battery cell is connected to a common current collector structure and a common battery management system (BMS). In the case of the module design, a plurality of battery cells are connected to constitute a submodule, and some submodules are connected to constitute the battery module. A battery management function may be implemented at a module or submodule level, thereby improving compatibility.

The plurality of battery modules may be combined to realize a rechargeable battery capable of charging and discharging at a high level such as for an electrical vehicle or a hybrid vehicle. At least one battery module is mechanically and electrically integrated, mounted with a thermal management system, and configured to communicate with an electrical consumer to constitute a battery system. The heat management system must ensure safety and efficiency of the battery module by discharging heat generated from the rechargeable battery.

It is not sufficient to statically manage output and discharge of the battery power in order to satisfy dynamic power demands of various electrical consumers connected to the battery system. Therefore, a constant exchange of information between the battery system and a manager of the electrical consumer is required, and this information includes important information such as actual state of charge (SoC) of the battery system, potential electrical performance, charging capability, and internal resistance, as well as actual or predicted power demand and surplus of the consumer.

The battery system typically includes a battery management system (BMS) or a battery management unit (BMU) to process the above information.

The BMS and BMU exchange information with control devices of various electrical consumers through a communication bus such as SPI or CAN interfaces. In addition, the BMS and the BMU may exchange information with each battery submodule or may exchange information with a cell supervision circuit (CSC) of each battery submodule.

The CSC may further include a cell connection and sensing unit (CCU) of the battery submodule for interconnecting the battery cells of the battery submodule.

For mechanical integration of the battery system, it is necessary to mechanically connect individual components, e.g., the battery submodules, or the battery submodules a support structure.

Such a connection structure should be designed so as to maintain an average cycle-life of the battery system and a function thereof under a stress applied while the battery system is in use, and so as to satisfy requirements of installation space and compatibility.

The mechanical integrity of the battery modules may be achieved by a carrier plate, i.e., by positioning the individual battery cells or submodules on a base plate.

For example, the battery cells or the battery submodules may be fitted into a depression formed in the carrier plate, may be coupled using a mechanical connecting member such as a bolt and a screw, or may be accommodated and fixed in a limited space, and accommodation of the battery cell or submodule in the limited space can be achieved by fixing the side plate.

In addition, the cover plate may be fixed to an upper portion of the battery cells, and as a further alternative, the battery submodules may be mounted on the battery module in a state where the battery submodules are arranged inside individual housings.

The conventional battery system includes a battery housing that functions as an enclosure that closes and seals the battery system from the outside and structurally protects constituent elements of the battery system, even when having a module structure. The battery system of such a housing structure is entirely mounted in an apparatus such as an electric vehicle.

Therefore, when a defect occurs in the system, e.g., when a defect occurs in the battery submodule, it is necessary to first remove the housing and disconnect the entire battery system.

Further, even when a slight defect occurs in the system, there is a problem that the entire battery system must be separated and replaced independently of the repair of the defective part.

Since the high capacity battery system is expensive, large, and heavy, it is difficult to perform the above-described operation, and such difficulty becomes greater as the battery system becomes larger in volume.

DISCLOSURE

Technical Problem

Therefore, one aspect of the present invention is to provide a vehicle body part having a structure in which assembling or disassembling constituent elements constituting a battery system of a vehicle is easy.

Technical Solution

Another aspect of the present invention is to provide a battery system that is safety-guaranteed, has a compact structure, and is integrated with the vehicle body part.

Another aspect of the present invention is to provide an integrated battery system vehicle including a vehicle body part integrally formed with the vehicle body part.

An exemplary embodiment of the present invention relates to a vehicle body part including a battery system, wherein the vehicle body part is integrally formed in a vehicle body, and includes a battery system carrier which accommodates a plurality of battery cells.

The vehicle body part may be integrally formed with the vehicle body, and may further include an additional part connected to the vehicle body to form an integral structure.

In other words, the vehicle body part may include the battery system carrier, and the vehicle body part may be integrally formed in the vehicle body instead of being mounted or attached to the vehicle body.

According to an exemplary embodiment of the present invention, a vehicle may include a body structure part for supporting a structure of the vehicle.

The vehicle body may be a vehicle frame, a self-supporting body (monocoque), or a space frame depending on the structure of the vehicle. The vehicle body may be made of vehicle body parts, and may be subjected to a load under a normal operating condition and a collision situation.

The vehicle body may be formed to have a monolithic structure from the beginning, or may be formed to have the monolithic structure by coupling of the vehicle body parts. In any case, the vehicle body part may be distinguished as a transverse beam and a longitudinal beam at least in a functional aspect.

The vehicle body may include an additional body part such as a bumper connected thereto, thereby improving stiffness or impact performance of the vehicle.

In general, additional parts such as boot lids, hoods, or mudguards may be coupled to the vehicle body. Particularly, when comparing a chassis structure with a monocoque structure, certain parts of the vehicle may be regarded as vehicle body parts or additional parts depending on a type of the vehicle body.

In the context of this specification, the vehicle body parts and the additional parts are always distinguished in a particular structure of the vehicle. In other words, the vehicle body parts and the additional parts are different to each other.

All the additional parts of the vehicle, particularly power techniques and assembly techniques, may be indirectly connected to at least the vehicle body.

According to an exemplary embodiment of the present invention, a constituent part assembly includes at least a heating and cooling assembly. Generally, an energy supply aggregation device such as a battery, a starter-generator, or a fuel cell is connected to the vehicle body as an aggregate. However, according to the present invention, the vehicle body includes a vehicle body part including an integrated battery system carrier for accommodating a plurality of battery cells. That is, the vehicle body part constitutes at least a portion of a housing that encloses the plurality of battery cells.

According to an embodiment of the present invention, the battery system carrier may accommodate a plurality of battery submodules, an electronic control assembly, and a connection member of the battery system. In other words, the battery system carrier accommodates the entire battery system and constitutes a portion of the housing of the battery system.

According to an exemplary embodiment of the present invention, the electronic control assembly may include a battery monitoring unit (BMU) or a battery management system (BMS). Alternatively, some functions of the BMS may be performed outside the battery system carrier. The electronic control assembly may include relays, fuses, and electronic elements. The connection member may include a high voltage (HV) wire or a low voltage (LV) wire.

According to an embodiment of the present invention, the electronic control assembly may perform at least one of a function to protect the battery system from damage, a function to extend a cycle-life of the battery system, and a function to keep the battery system in a state of being capable of satisfying functional requirements specified in applicable apparatuses.

The electronic control assembly may also perform one or more of functions of battery cell protection, charge control, charge state determination, cycle-life determination, battery cell balancing, a log book, authentication, battery cell identification, and signal communication.

According to an exemplary embodiment of the present invention, the battery system carrier may include a carrier frame including two longitudinal frames and two transverse frames perpendicularly connected to the longitudinal frames.

The battery system carrier may further include a battery system cover coupled to the carrier frame. Specifically, the battery system cover may be formed throughout the carrier frame, and may cover an entire surface thereof while surrounded by the carrier frame, for example.

The battery system cover may be formed as a portion of an underbody of a vehicle. In other words, the carrier frame and the battery system cover may be integrally formed with the vehicle body part which is a portion of a bottom of the vehicle.

Specifically, the vehicle underbody may separate an interior and an exterior of the vehicle, and the carrier frame may accommodate a plurality of battery cells disposed on the exterior of the vehicle.

According to an embodiment of the present invention, the battery system carrier may accommodate a plurality of removable battery component carriers. In this case, each of the battery component carriers may accommodate a battery submodule including a plurality of battery cells. In addition, each of the battery component carriers may be mechanically or electrically connected to at least one of other battery component carriers and the battery system carrier to constitute the battery system. Additionally, the battery system carrier may accommodate an electronic component carrier that accommodates the electronic control assembly.

The longitudinal and transverse frames of the carrier frame may be made of an extruded aluminum profile or a plastic extruded profile (e.g., a reinforced plastic extruded profile), and may be welded/glued/screwed or otherwise assembled to form the carrier frame.

The battery component carrier and the electronic component carrier may be made of an extruded aluminum profile (e.g., a reinforced plastic extrusion profile), or may be made as a rolled and welded steel carrier, and specifically may be made to have a U, L, or T-type structure.

The electronic component carrier and the battery component carrier may be attached to the longitudinal frame or the transverse frame, and may further include a connection member corresponding to the longitudinal frame or the transverse frame or a connection member that is detachable therefrom.

The electronic component carrier and the battery component carrier may have a structure in which a coolant duct or a coolant channel is integrally formed on a base plate or a side plate of each component carrier. Specifically, the carrier frame may include a coolant port connected to the coolant channel of each component carrier.

Another aspect of the present invention relates to a battery system including a battery system carrier that is integrally formed with a vehicle body part.

In such a battery system, the vehicle body part may be integrally formed with the vehicle body as described above. The battery system may further include a plurality of battery cells housed within the battery system carrier.

In other words, the battery system carrier according to one aspect of the present invention includes the vehicle body part as a portion of the housing of the battery system, and may provide mechanical integrity to the battery system.

According to an exemplary embodiment of the present invention, in the battery system, the battery system carrier may include a carrier frame including two longitudinal frames and two transverse frames. The transverse frames may be perpendicularly connected to the longitudinal frames. The battery system carrier may further include a battery system cover coupled to the carrier frame. Specifically, the battery system cover may be formed throughout the carrier frame, and may cover an entire surface thereof surrounded by the carrier frame, for example.

The battery system cover may be formed as a portion of an underbody of a vehicle. In other words, the carrier frame and the battery system cover may be integrally formed with the vehicle body part which is a portion of a bottom of the vehicle. Specifically, the vehicle underbody may separate an interior and an exterior of the vehicle, and the carrier frame may accommodate a plurality of battery cells disposed on the exterior of the vehicle.

According to an embodiment of the present invention, the battery system carrier may accommodate a plurality of removable battery component carriers. In this case, each of the battery component carriers may accommodate a battery submodule including a plurality of battery cells. Further, each battery component carrier is individually detachable from the carrier frame. The battery system carrier may additionally accommodate an electronic component that accommodates the electronic control assembly.

According to an embodiment of the present invention, the longitudinal and transverse frames of the carrier frame may be made of an extruded aluminum profile or a plastic extruded profile (e.g., a reinforced plastic extruded profile), and may be welded/glued/screwed or otherwise assembled to form the carrier frame.

In addition, the battery component carrier and the electronic component carrier may be made of an extruded aluminum profile (e.g., a reinforced plastic extrusion profile), or may be made as a rolled and welded steel carrier, and specifically may be made to have a U, L, or T-type structure.

According to an embodiment of the present invention, the electronic component carrier and the battery component carrier may be attached to the longitudinal frame or the transverse frame, and may further include a connection member corresponding to the longitudinal frame or the transverse frame or a connection member that is detachable therefrom.

The electronic component carrier and the battery component carrier include may have a structure in which a coolant duct or a coolant channel is integrally formed on a base plate or a side plate of each component carrier. Specifically, the carrier frame may include a coolant port connected to each coolant channel of each component carrier.

In an embodiment of the battery system according to the invention, the battery component carrier includes a base plate and a pair of side surfaces disposed perpendicularly to the base plate to extend along two edges of the base plate that face each other in a longitudinal direction.

Each of the battery component carriers may further include a pair of end plates disposed perpendicularly to the base plate and the side plate to extend along two edges of the base plate that face each other in a width direction.

The end plate may be mechanically coupled to the pair of side plates or the base plate to fix a battery cell array including a plurality of battery cells.

The battery component carrier may further include a cell cover disposed parallel to the base plate so as to form an accommodating space of the battery submodule together with the base plate, the side plates, and the end plates.

In the battery system according to an exemplary embodiment of the present invention, a cell connection and sensing unit (CCU) may be disposed between the cell cover and the cell submodule.

The cell connection and sensing unit may electrically connect the battery cells in the battery submodule to a circuit in a parallel or series manner. The cell connection and sensing unit may be electrically connected to the battery cells in the battery submodule so as to monitor voltage and temperature of the battery cells.

In the battery system according to an exemplary embodiment of the present invention, the battery system carrier may include an external signal port for electrically connecting the battery system to an external control unit. The external control unit may be a control circuit of an at least one electrical consumer.

The electronic component carrier, e.g., an electronic control assembly, may be electrically connected to the battery component carrier and an external signal port of the battery system carrier to interconnect the battery submodule and the electrical consumer through the external signal port.

The carrier frame may further include an external coolant port connected to an external coolant circuit, and may also include a plurality of internal coolant ports. The internal coolant port may be connected to the coolant channels of the electronic component carrier and the electrical component carrier in the battery system so as to form a coolant circuit.

In one specific example, the carrier frame may include a coolant port connected to a cooling channel disposed within the base plate of the battery component carrier.

Another aspect of the present invention relates to an integrated battery system vehicle formed integrally with a battery system, wherein the integrated battery system vehicle may include a vehicle body and a vehicle body part formed integrally with the vehicle body.

The vehicle body part may include a battery system carrier for accommodating a plurality of battery cells.

According to an exemplary embodiment of the present invention, in a vehicle, the battery system carrier can accommodate a plurality of battery submodules, an electronic control assembly, and a connection member.

Accordingly, the battery system carrier may accommodate the entire battery system and may constitute a portion of the housing of the battery system.

According to an exemplary embodiment of the present invention, in a vehicle, the electronic control assembly may include a battery monitoring unit (BMU) or a battery management system (BMS). Alternatively, some functions of the BMS may be performed outside the battery system carrier. The electronic control assembly may include relays, fuses, and electronic elements. The connection member may include a high voltage (HV) wire or a low voltage (LV) wire.

According to an exemplary embodiment of the present invention, in a vehicle, the electronic control assembly may perform at least one of a function to protect the battery system from damage, a function to extend a cycle-life of the battery system, and a function to keep the battery system in a state of being capable of satisfying functional requirements specified in applicable apparatuses.

The electronic control assembly may also perform one or more of functions of battery cell protection, charge control, charge state determination, cycle-life determination, battery cell balancing, a log book, authentication, battery cell identification, and signal communication.

According to an exemplary embodiment of the present invention, in a vehicle, the battery system carrier may include a carrier frame including two longitudinal frames and two transverse frames perpendicularly connected to the longitudinal frames. The battery system carrier may further include a battery system cover coupled to the carrier frame to constitute a portion of an underbody of the vehicle.

According to an exemplary embodiment of the present invention, in a vehicle, the vehicle underbody may separate an interior and an exterior of the vehicle, and the carrier frame may accommodate a plurality of battery cells disposed on the exterior of the vehicle. In addition, the vehicle body part may include a battery system cover for fixing the battery cell inside the vehicle.

According to an exemplary embodiment of the present invention, in a vehicle, the vehicle may further include an underbody protecting member coupled to the carrier frame. The underbody protecting member may be configured to surround a plurality of battery cells accommodated in the carrier frame between the battery system cover and the underbody protecting member.

The underbody protecting member may extend over an entire lower portion of the vehicle or extend over the carrier frame to cover additional parts of the lower portion of the vehicle.

Another aspect of the present invention may be apparent from the dependent claims, the accompanying drawings, and/or the description of the drawings.

Advantageous Effects

According to the exemplary embodiments of the present invention, it is possible to easily assemble or separate parts without separating or replacing the entire battery system by providing a vehicle body part in which a component carrier of the battery system can be individually attached to or detached from a carrier frame that is integrally formed with the vehicle body part.

In addition, according to the exemplary embodiments of the present invention, a battery system having a compact structure may be provided by providing mechanical stability to a carrier frame of the battery system using a wiring carrier as a center frame of the carrier frame and by providing a space for accommodating the component carrier.

MODE FOR INVENTION

Figure 1:
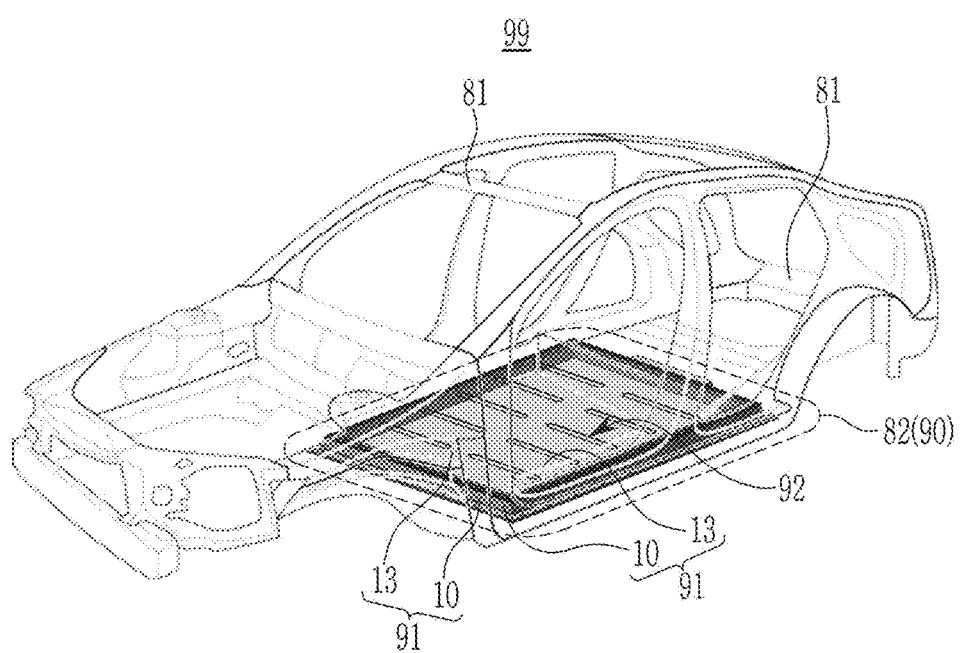
FIG. 1 illustrates a schematic perspective view of a vehicle body according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

Throughout this specification and the claims that follow, when it is described that an element is "coupled/connected" to another element, the element may be "directly coupled/connected" to the other element or "indirectly coupled/connected" to the other element through a third element. In addition, unless explicitly described to the contrary, the word "comprise" and variations such as "comprises" or "comprising" will be understood to imply the inclusion of stated elements but not the exclusion of any other elements.

The terms "first", "second", "third", and the like may be used herein to describe various members, constituent elements, regions, layers, and/or sections, but these members, constituent elements, regions, layers, and/or sections should not be limited by these terms. These terms are used to distinguish one member, element, region, layer, or section from another member, element, region, layer, or section.

In the present specification, the term "comprise", "include", or "have" should be understood as specifying the presence of practiced features, steps, constitutional elements, or a combination thereof, but not precluding the possibility of presence or addition of one or more of other features, steps, constitutional elements, or a combination thereof.

In addition, as used herein, the term "and/or" includes any plurality of combinations of items or any of a plurality of listed items. In this specification, "A and/or B" may include "A", "B", or "A and B".

The use of "can/may" in describing an exemplary embodiment of the present invention indicates "at least one exemplary embodiment of the present invention."

As used in this specification, terms such as "use," "using," and "used" may be understood to have the same meaning as "utilize", "utilizing", and "utilized", respectively.

FIG. 1 illustrates a schematic perspective view of a vehicle body according to an exemplary embodiment of the present invention.

Referring to FIG. 1, the vehicle body 99 may be formed of a chassis or a frame, which includes a plurality of vehicle body parts. For example, the vehicle body 99 may have an integral structure in which the vehicle body parts are strongly coupled to each other by welding. Although not illustrated therein, additional parts such as doors, hoods, and trunk lids, or a power unit such as an engine, may be coupled to or mounted on the vehicle body.

The vehicle body 99 may include a plurality of cross beams 81 disposed at a rear or roof portion thereof as vehicle body parts.

The vehicle body 99 may further include a vehicle bottom portion 82 that constitutes a cabin floor of the vehicle body 99. In this specification, it may be understood that a vehicle body part 90 corresponding to the vehicle bottom portion 82 among the vehicle body parts included in the vehicle body 99 is distinguished from other vehicle body parts.

The vehicle bottom portion 82 may include a battery system carrier 91 integrally formed with the bottom portion 82.

The battery system carrier 91 may include a battery system cover 13, which is a portion of a vehicle underbody 92, and a carrier frame 10, which is disposed at a lower portion of the vehicle underbody 92. The carrier frame 10 and the battery system cover 13 may be integrally formed with the vehicle bottom portion 82.

The vehicle underbody 92 may separate an interior and an exterior of the vehicle, and the carrier frame 10 may be disposed outside the vehicle.

Figure 2:
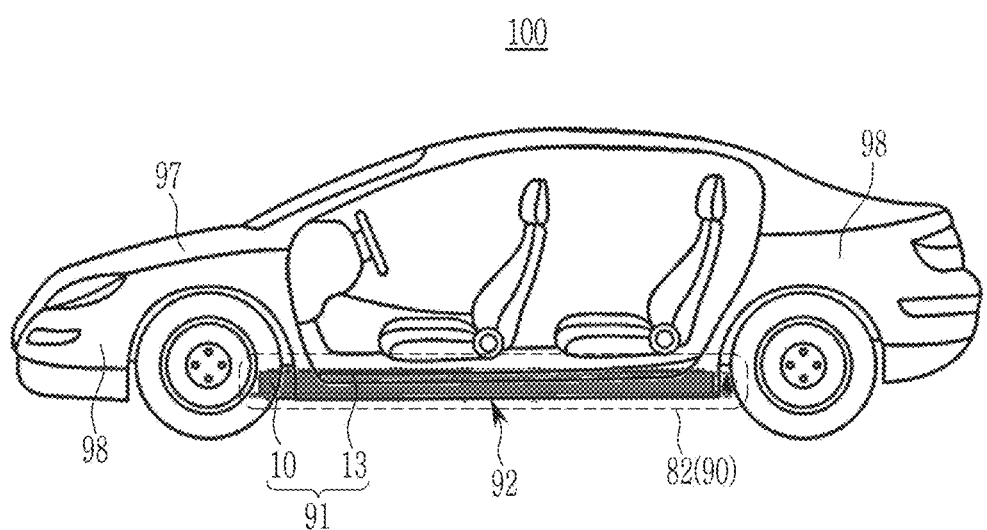
FIG. 2 illustrates a schematic side view of a vehicle body according to an exemplary embodiment of the present invention.

FIG. 2 illustrates a schematic side view of a vehicle body according to an exemplary embodiment of the present invention.

Referring to FIG. 2 together with FIG. 1, a vehicle 100 may include additional parts such as a hood 97 disposed in front of the vehicle and a fender 98 disposed in front and rear thereof, coupled to the vehicle body 99.

The vehicle 100 may further include the vehicle bottom portion 82 which is one of the vehicle body parts 90 including the battery system carrier 91 including the carrier frame 10, and the battery system cover 13.

FIG. 3 to FIG. 6 illustrate an assembling process of a battery system according to an exemplary embodiment of the present invention.

Figure 3:
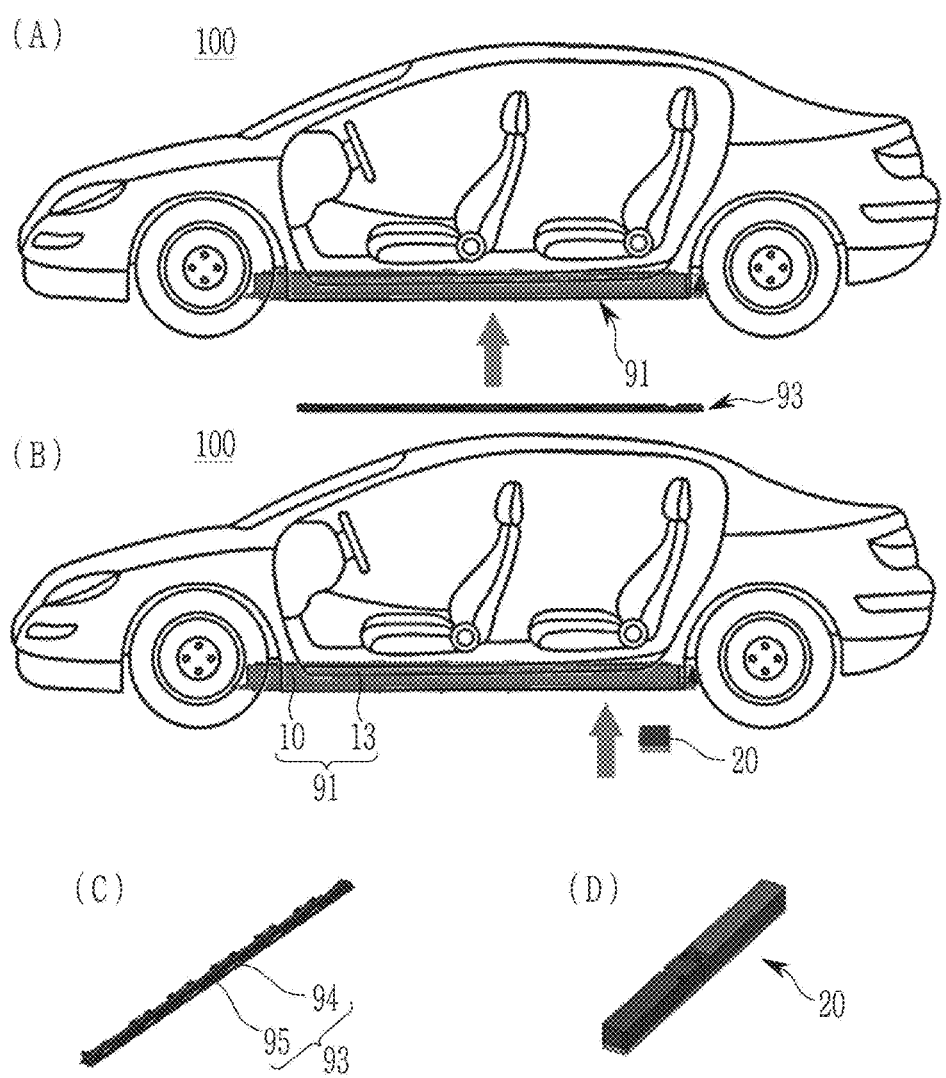
FIG. 3 to FIG. 6 illustrate an assembling process of a battery system according to an exemplary embodiment of the present invention.

First, in an assembling step of FIG. 3 (A), a wiring carrier 93 including a high voltage bus bar 94 and a low voltage wiring harness 95 illustrated in FIG. 3 (C) may be mounted in the battery system carrier 91.

Figure 6:
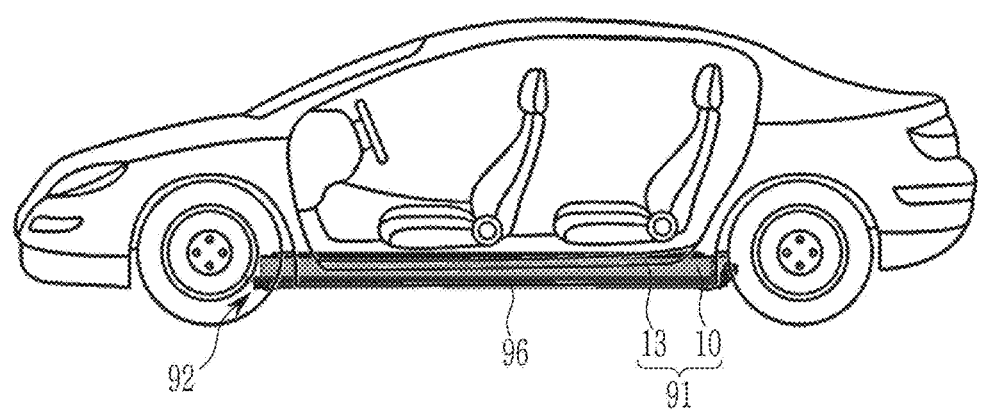

Referring to FIG. 3 together with FIG. 6, the wiring carrier 93 may electrically and electronically connect an electronic component carrier 20 and a battery submodule 40 of a battery system 50, to be assembled.

The wring carrier 93 may be formed as a center frame of the carrier frame 10 having a rectangular structure included in the battery system carrier 91 to provide mechanical stability and an additional space for mounting the electronic component carrier 20 and a battery component carrier 30 to be subsequently mounted.

Next, in an assembling step of FIG. 3 (B), the electronic component carrier 20 illustrated in FIG. 3 (D) may be mounted in the battery system carrier 91.

The electronic component carrier 20 may include at least one battery junction box (BJB) and a battery management unit (BMU).

Both of the wiring carrier 93 and the electronic component box 20 may be fixed to the carrier frame 10 by a bolt, clip, or a locking system.

Figure 4:
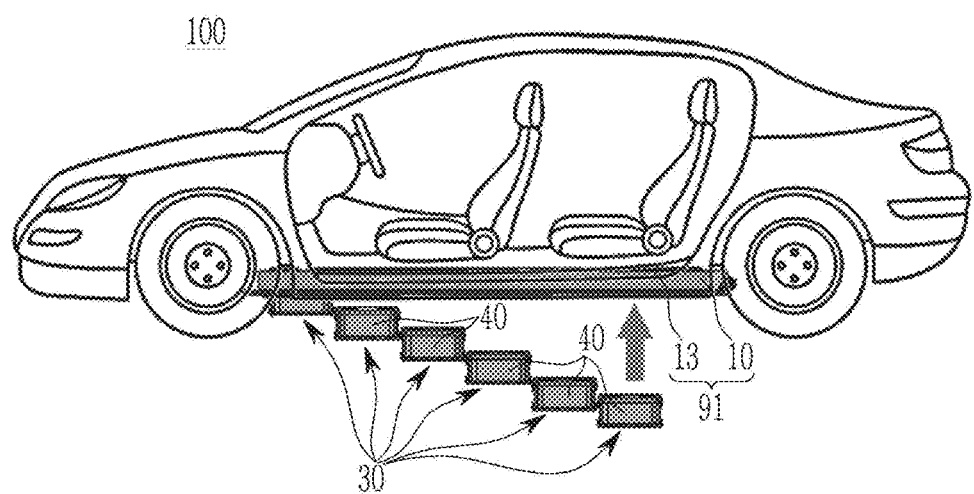

Next, in the assembling step of FIG. 4, a plurality of battery component carriers may be mounted on the battery system carrier.

As will be described in detail below, the battery submodule 40 formed to include a plurality of arranged battery cells 1 may be mounted in the battery component carrier 30.

The battery component carrier 30 may be made of a molded steel or aluminum profile that can cool the battery cells 1, battery cell connectors, and module electronic devices (not illustrated) while structurally fixing them. Such a plurality of battery component carriers 30 may be mounted and fixed in the carrier frame 10 at a lower portion of the vehicle 100.

Figure 5:
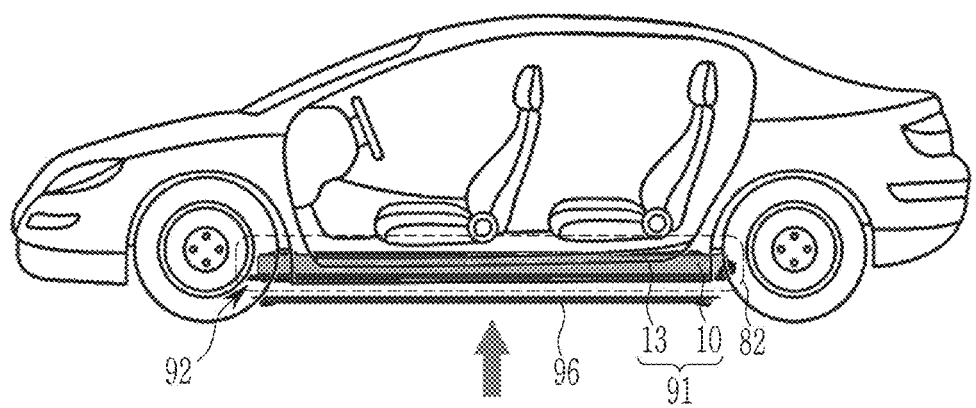

Finally, in the assembling step of FIG. 5, an underbody protecting member 96 may be mounted in the battery system carrier 91 formed integrally with the vehicle bottom portion 82 at the lower portion of the vehicle 100.

Accordingly, the underbody protecting member 96 may enclose the battery component carrier 30 and the electronic component carrier 20 accommodated in the carrier frame 10, which is disposed between the vehicle underbody 92 and the underbody protecting member 96.

FIG. 6 illustrates an underbody protecting member mounted in the battery system carrier through the step of FIG. 5.

Figure 7:
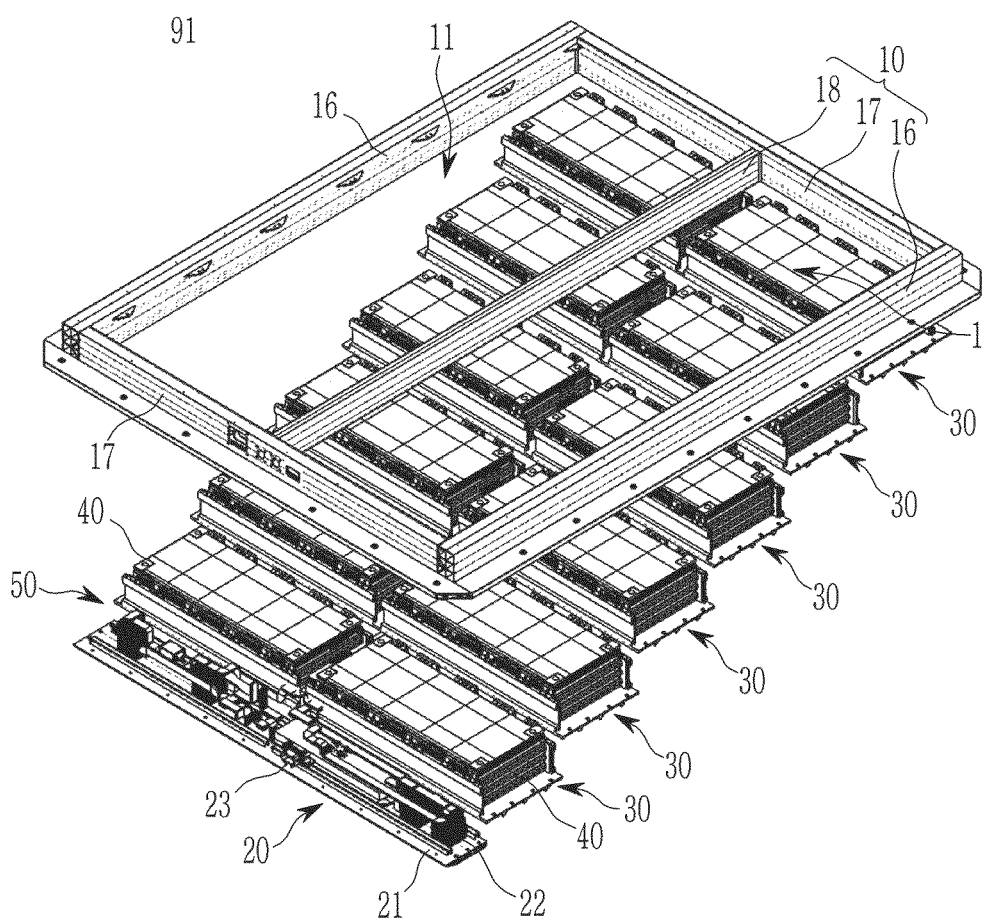
FIG. 7 illustrates a schematic perspective view of a battery system accommodated in a battery system carrier according to an exemplary embodiment of the present invention.

FIG. 7 illustrates a perspective view of a rechargeable battery according to an exemplary embodiment of the present invention.

Referring to FIG. 7 together with FIG. 1 to FIG. 6, the battery system 50 includes the carrier frame 10, which is integrally formed with the vehicle body part 90 and is coupled to the system cover 13.

However, in this drawing, the carrier frame 10 is separated from the vehicle component 90 in order to easily illustrate this exemplary embodiment.

Referring to FIG. 7, the carrier frame 10 may include two longitudinal frames 16 and two transverse frames 17.

At least one of the two transverse frames 17 includes an external signal port connected to an external control unit (not illustrated) and an external power port (not illustrated) connected to an external power signal (not illustrated).

The carrier frame 10 may further include a center frame 18 that extends parallel to the longitudinal frames 16 to divide an inner space of the carrier frame 10 into two subspaces 11, and the central frame 18 may be the wiring carrier 93 illustrated in FIG. 3.

In other words, the longitudinal frames 16 and the transverse frames 17 may be portions of the carrier frame 10 integrally formed with the vehicle body part 90, while the wiring carrier 93 may be installed as the center frame in an assembling process of the battery system 50 for the vehicle 100.

The carrier frame 10 having such a structure may accommodate the removable electronic component carrier 20 and a plurality of removable battery component carriers 30.

Although it is illustrated in the drawing that one electronic component carrier 20 and six battery component carriers 30 are accommodated in the carrier frame 10, a number of the accommodated carriers is not limited thereto.

In summary, the wiring carrier 93 as the central frame 18 may provide mechanical stability to the carrier frame 10, and may provide an additional space for accommodating the electronic component carrier 20 and the battery component carrier 30.

The electronic component carrier 20 may include a base plate 21 and an electronic control assembly 22 disposed in the base plate 21.

The electronic component carrier 20 may further include a signal port 23 for transmitting a control signal between the electronic control assembly 22 and an external control circuit (not illustrated), and a power port 23 for electrically connecting the carrier frame 10 to an external power circuit (not illustrated), e.g., a battery system or a battery management system.

In addition, the electronic component carrier 20 may be connected directly to one or more electrical consumers.

The electronic control assembly 21 may control the battery submodule 40 accommodated in the battery component carrier 30 based on a control signal, and, for example, may control the battery submodule 40 in order to supply power that satisfies a power demand based on an actual demand of power.

For an electrical connection relationship between the respective constituent elements, the electronic control assembly 22 may be electrically connected to the electronic component carrier 20, and the electronic component carrier 20 may be electrically connected to the battery component carrier 30 that is disposed adjacent thereto. In addition, the battery component carrier 30 may be electrically connected to the battery submodule 40 mounted therein and another battery component carrier 30 disposed adjacent thereto.

Through the electrical connection, the electronic control assembly 22 may transmit a signal for controlling the battery submodule 40, the battery submodule 40 may supply a current in response to the signal, and the supplied current may be transmitted.

According to the exemplary embodiment of the present invention, the control signal may be modulated to a current or voltage between the electronic component carrier 20 and the battery component carrier 30 or between the battery submodules 40.

A cooling channel (not illustrated) through which a coolant can flow may be formed at a lower portion of the bottom plate 20 of the electronic component carrier 20.

Since the electronic component carrier 20 is individually detachable from the carrier frame 10, the electronic control assembly 22 may be easily replaced or repaired.

Figure 8:
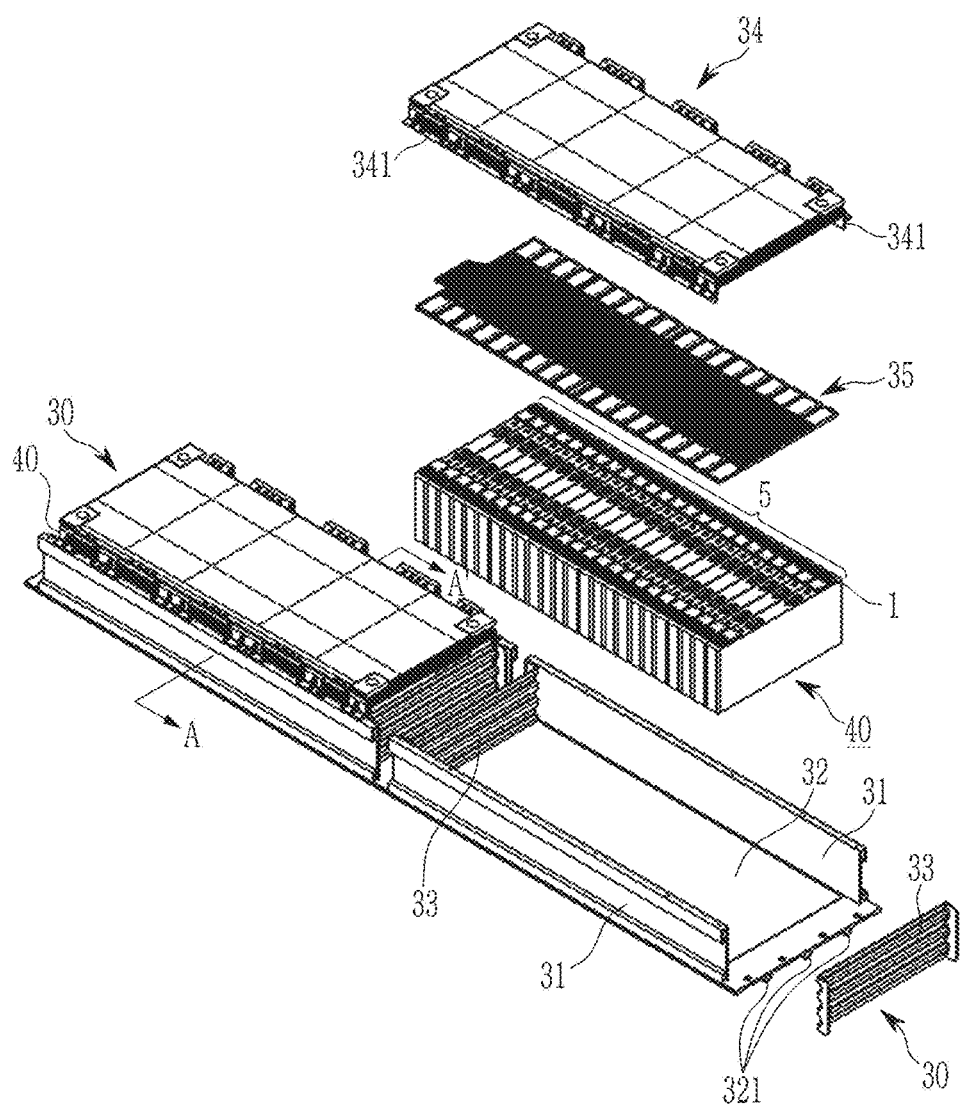
FIG. 8 illustrates a perspective view of a battery component carrier separated from a carrier frame of FIG. 7 and a battery submodule accommodated in the battery component carrier.
Figure 9:
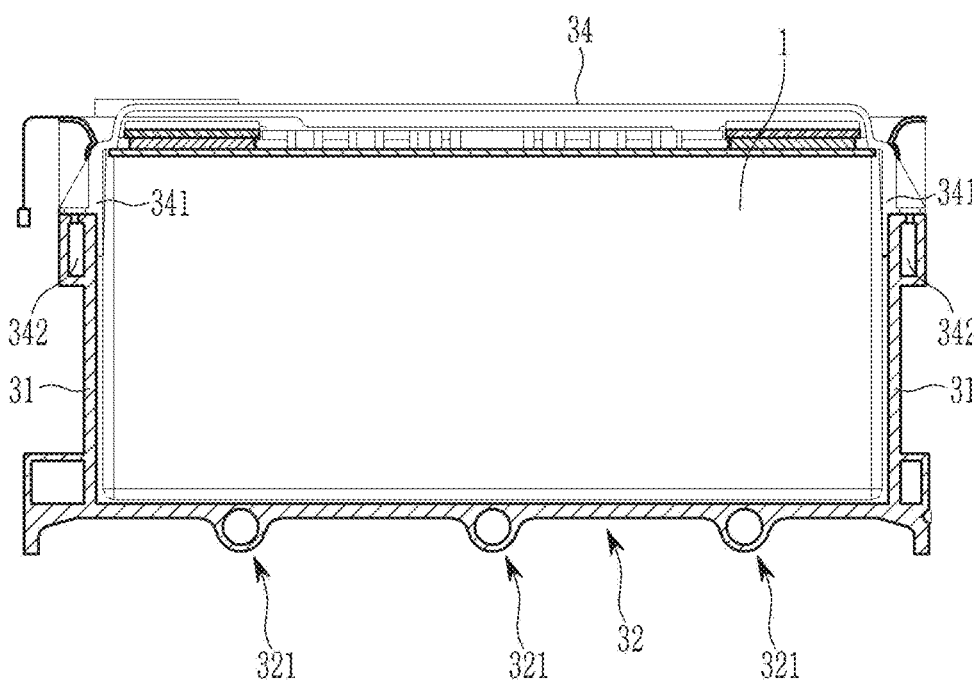
FIG. 9 illustrates a vertical cross-sectional view taken along a line A-A' of FIG. 8.

FIG. 8 illustrates a battery component carrier separated from a carrier frame of FIG. 7 and a battery submodule accommodated in the battery component carrier, and FIG. 9 illustrates a vertical cross-sectional view taken along a line A-A' of FIG. 8.

Referring to FIG. 8, the battery component carrier 30 may include one or more battery submodules 40. Although it is illustrated in this drawing that two battery submodules 40 are housed in the battery component carrier 30, a number of battery submodules 40 to be accommodated is not limited thereto.

Referring to FIG. 8, the battery component carrier 30 may include a base plate 32 and a pair of side plates 31 disposed at edges of the base plate 32 in a longitudinal direction thereof to extend toward an upper side of the base plate 32 from the edges thereof.

The battery submodule 40 may be disposed in an accommodation space formed by the base plate 32 and the pair of side plates 31 to be mechanically fixed to the battery component carrier 30 in a tightly wrapped state. The battery submodule 40 may be adhered to the side plates 31 or the base plate 32 to be further fixed in a vertical direction.

The base plate 32 and the side plates 31 may be formed as a single member. The base plate 32 and the side plates 31 may be made of an extruded aluminum profile, a reinforced plastic extrusion profile, or a rolled and welded steel carrier, including a bottom portion and a side portion.

Referring to FIG. 8 together with FIG. 7, the battery component carrier 30 includes a connection member (not illustrated) that is detachable from the longitudinal frames 16 of the carrier frame 10, and the connection member may be a screw hole for fixing the battery component carrier 30 to the carrier frame 10.

The battery component carrier 30 may further include a connection member (not illustrated) for electrically connecting the battery component carriers 30 or for electrically connecting the battery component carriers 30 to the electronic component carrier 20 in the battery system 50.

The connection member may include an electrical connection member such as a high voltage bus bar capable of providing high voltage power connection between the battery submodules 40 on the battery component carrier 30.

The connection member may further include an electronic connection member such as a wiring harness capable of providing low voltage connection between the electronic component carrier 20 and a cell monitoring circuit (CSC) or between the cell connection and sensing units (CCU) of the battery submodules 40.

Referring to FIG. 8, the battery submodule 40 may include a plurality of battery cells 1, each of which has a planar shape. The plurality of battery cells 1 may constitute a battery cell array 5, and may be mounted in the battery component carrier 30 in a state where a pair of end plates 33 are respectively disposed at battery cells positioned at outermost sides of the battery cell array 5.

Alternatively, the battery cell array 5 may be mounted in the battery component carrier 30 in a state where one of the pair of end plates 33 is first fixedly coupled to the side plates 31 or the base plate 32 of the battery component carrier 30.

The end plates 33 may be fixedly coupled to another member of the battery component carrier 30. The battery cell array 5 may be primarily assembled in the longitudinal direction together with the end plates 33, which may be disposed at one side or opposite sides thereof. This primary assembly step may be performed by a means such as an elastic member, a spring, or a screw.

Referring to FIG. 8, the end plates 33 may be mechanically coupled to the side plates 31 of the battery component carrier 30. The end plates 33, the base plate 32 and the side plates 31 of the battery component carrier 30 may be coupled to each other by a type of welding, which may be, e.g., friction stir welding or tungsten inert gas welding—clinching, clamping, riveting, wedging, or gluing.

Accordingly, the plurality of battery cells 1 may be fixed in a first direction by the end plates 33, and may be fixed in a second direction by the side plates 31. Herein, the first direction indicates a longitudinal direction of the battery component carrier 30, and the second direction indicates a width direction of the battery component carrier 30 that is perpendicular to the first direction.

The end plates 33 may be formed of an extruded aluminum profile, aluminum or steel sheet metal, an aluminum cast part, a reinforced plastic extrusion profile, or a molded part so as to provide stiffness and mechanical stability to the battery submodule 40.

In addition, a swelling phenomenon in which the battery cells swell occurs in a process of aging the battery cells. The end plate 33 may contain an expansion force generated when the battery cells 1 are swollen and guide the battery cells into the battery component carrier 30, thereby suppressing the effect of the swelling phenomenon.

A cell cover 34 may be disposed at an upper portion of the battery submodule 40.

The cell cover 34 may be fixedly coupled to the side plate 31. Accordingly, the battery cells 1 may be more strongly fixed in a third direction by the cell cover 34, wherein the third direction indicates a direction perpendicular to both the first direction and the second direction.

Referring to FIG. 8 together with FIG. 9, the cell cover 34 may be clamped between the battery cells 1 and the side plates 31.

For example, the cell cover 34 may include a pair of clamps 341 extending from opposite sides thereof, and the pair of clamps 341 may be inserted and clamped between the battery cell 1 and the side plate 31 and fixed.

In addition, the cell cover 34 may be fixed to the side plates 31 by a coupling method using a screw 342.

The cell cover 34 may not only fix the battery cells 1 in place, but may also prevent contact from the outside.

The battery component carrier 30 including the battery cells 1, the end plates 33, the cell cover 34, and additional components may be separately removable from a state of being mounted in the carrier frame 10 of the battery system 50, and may be separately removable even when the battery system 50 is mounted to the vehicle 100.

Referring to FIG. 9 together with FIG. 8, the base plate 32 may include a plurality of cooling channels 321.

The cooling channels 321 may be formed at a lower portion of the base plate 32, and an arrangement direction of the cooling channels 321 may be independent of the direction in which the battery cells 1 are arranged.

In the meantime, an external coolant port (not illustrated) is arranged on the transverse frames 17 of the carrier frame 10, and a coolant distribution line (not illustrated) connected to the external coolant port may be formed.

In this case, a plurality of connection pieces (not illustrated) included in the coolant distribution line may connect the coolant distribution line to any one of the cooling channels 321 of the base plate 32 through respective coolant ports (not illustrated) of the battery component carriers 30.

Therefore, a coolant supplied to the external coolant port of the carrier frame 10 by the external coolant circuit (not illustrated) may be supplied to the coolant ports of the battery component carriers 30 and the electronic component carrier 20 through the coolant distribution lines.

The coolant thus supplied flows from the transverse frame 17 disposed at a first side to the transverse frame 17 disposed at a second side through the respective coolant channels 321 of each of the base plates 32, and flows back to one of the external coolant ports through another coolant distribution line.

Referring to FIG. 8, a cell connection and sensing unit 35 including a cell connector, a sensor, and an electronic device may be provided between the cell cover 34 and the battery submodule 40.

The cell connection and sensing unit 35 includes a flexible circuit board (FCB) having connection terminals connected to electrode terminals of the battery cells 1, and a semiconductor element (not illustrated) formed on an upper surface of the flexible circuit board. A wiring pattern (not illustrated) may be formed on a surface of the flexible circuit board.

A main body of the flexible circuit board may be formed of a flexible electrically insulating material such as polyimide (PI) or polyethylene (PET), and the wiring pattern may be formed of copper (Cu), titanium (Ti), nickel (Ni), or palladium (Pd).

The semiconductor element may apply a signal for controlling an operation of the battery cells 1. Particularly, the semiconductor element may control a degree of charge or discharge of the battery cells 1 through a high voltage connection. In addition, the semiconductor element may apply a signal indicative of a voltage, a current, and a state of charge (SOC) in order to prevent overcharge or overdischarge.

In other words, the cell connection and sensing unit 35 may provide a main power supply path by interconnecting the electrode terminals of the battery cells 1 and the electrode terminals of the battery submodule 40.

The cell connection and sensing unit 35 may further include voltage sensing lines (not illustrated) for voltage sensing and cell balancing, and may further include a temperature sensor capable of sensing a temperature of the battery cells 1.

The cell connection and sensing unit 35 is composed of a lightweight flexible carrier to compensate movement of the battery cells when they expand or contract.

The cell connection and sensing unit 35 may be configured to mount a printed circuit board of a cell supervision circuit (CSC-PCB).

An electronic or electrical device and/or any other related device or component in accordance with an embodiment of the present invention described herein may be used interchangeably with hardware, firmware (e.g., a specific purpose integrated circuit), software, or a combination of software, firmware, and hardware.

For example, various constituent elements of such devices may be formed on one integrated circuit (IC) chip or on an individual integrated circuit chip.

In addition, various constituent elements of such devices may be implemented on a flexible circuit film, a tape carrier package (TCP), a printed circuit board (PCB), or a single substrate.

Further, various constituent elements of such devices may be executed on one or more processors or executed on one or more computing devices, may execute computer program instructions, and may be processes or threads that interact with other system constituent elements to perform various functions described herein.

The computer program instructions may be stored in a memory that is operable on a computing device using standard memory devices such as a random access memory (RAM).

In addition, the computer program instructions may also be stored in a non-volatile computer readable medium, such as a CD-ROM, a flash drive, or the like.

It will also be recognized by those skilled in the art that functions of the various computing devices may be combined or integrated in a single computing device, or functions of a particular computing device may be distributed across one or more other computing devices without departing from the scope of embodiments of the present invention.

While this invention has been described in connection with what is presently considered to be practical exemplary embodiments, it is to be understood that the invention is not

| <Description of Symbols> | |
|---|---|
| 1: battery cell | |
| 10: carrier frame | |
| 11, 12: subspace | |
| 13: battery system cover | |
| 16: longitudinal frame | 17: transverse frame |
| 18: center frame | |
| 20: electronic component carrier | 21: base plate |
| 22: electronic control assembly | 23: signal port |
| 30: battery component carrier | |
| 31: side plate | 32: base plate |
| 321: cooling channel | |
| 33: end plate | 34: cell cover |
| 35: cell connection and sensing unit | |
| 40: battery submodule | |
| 50: battery system | |
| 81: cross beam | 82: vehicle bottom portion |
| 90: vehicle body part | 91: battery system carrier |
| 92: vehicle underbody | 93: wiring carrier |
| 94: high voltage bus bar | 95: low voltage wiring harness |
| 96: underbody protecting member | |
| 99: vehicle body | |
| 100: vehicle | |

The invention claimed is:

1. A vehicle body with a battery system comprising:
a vehicle bottom portion; and
a battery system carrier in the vehicle bottom portion, the battery system carrier comprising carrier frame integrated in the vehicle bottom portion,
wherein the carrier frame is configured to accommodate a plurality of battery cells therein.

2. The vehicle body of claim 1, wherein the carrier frame is configured to accommodate a plurality of battery submodules, an electronic control assembly, and a connection member.

3. The vehicle body of claim 1, wherein the carrier frame comprises two longitudinal frames and two transverse frames perpendicularly connected to the longitudinal frames,
wherein the battery system carrier further comprises a battery system cover coupled to the carrier frame, and
wherein at least the battery system cover is formed as a portion of a vehicle underbody.

4. The vehicle body of claim 3, wherein the vehicle underbody separates an interior and an exterior of the vehicle body, and
wherein the battery cells are disposed outside the vehicle body.

5. The vehicle body of claim 1, wherein the battery system carrier accommodates a plurality of removable battery component carriers, and
wherein each of the battery component carriers accommodates a battery submodule including a group of the battery cells, and
wherein each of the battery component carriers is mechanically and electrically connected to at least one of the other battery component carriers and the battery system carrier to form the battery system.

6. A vehicle battery system comprising:
a battery system carrier comprising a carrier frame, the carrier frame being formed integrally with a vehicle body part formed integrally in a vehicle body; and
a plurality of battery cells disposed in the carrier frame.

7. The vehicle battery system of claim 6, wherein the carrier frame comprises two longitudinal frames and two transverse frames perpendicularly connected to the longitudinal frames,
wherein the battery system carrier further comprises a battery system cover coupled to the carrier frame, and
wherein at least the battery system cover is formed integrally with a vehicle underbody of the vehicle body.

8. The vehicle battery system of claim 7, wherein the carrier frame accommodates a plurality of removable battery component carriers,
wherein each of the battery component carriers accommodates at least one battery submodule including a group of the battery cells, and
wherein each of the battery component carriers is detachable from the carrier frame.

9. The vehicle battery system of claim 8, wherein each of the battery component carriers includes:
a base plate;
a pair of side plates disposed perpendicularly to the base plate to extend along two edges facing each other in a longitudinal direction of the base plate;
a pair of end plates disposed perpendicularly to the base plate and the side plates to extend along two edges facing each other in a width direction of the base plate; and
a cell cover disposed parallel to the base plate,
wherein the end plates are mechanically coupled to the base plate or the pair of side plates to fix the plurality of battery cells, and
wherein the cell cover, the base plate, the side plates, and the end plates form an accommodating space of the battery submodule.

10. The vehicle battery system of claim 9, wherein each of the battery component carriers further includes a cell connection and sensing unit disposed between the cell cover and the battery submodule.

11. The vehicle battery system of claim 7, further comprising an electronic component carrier that is detachable from the carrier frame to accommodate an electronic control assembly.

12. The vehicle battery system of claim 9, wherein the carrier frame includes a coolant port connected to a cooling channel disposed in the base plate of the battery component carrier.

13. An integrated battery system vehicle comprising:
a vehicle body; and
a battery system carrier integrally formed in the vehicle body and configured to accommodate a plurality removeable battery component carriers, each of the battery component carriers comprising a plurality of battery cells.

14. The integrated battery system vehicle of claim 13, wherein the battery system carrier includes a carrier frame comprising two longitudinal frames and two transverse frames perpendicularly connected to the longitudinal frames; and
a battery system cover coupled to the carrier frame and configured as a portion of a vehicle underbody,
wherein the vehicle underbody separates an interior and an exterior of the vehicle body, and
the carrier frame accommodates the battery component carriers disposed outside the vehicle body.

15. The integrated battery system vehicle of claim 14, further comprising an underbody protecting member connected to the carrier frame, and wherein the battery cells accommodated in the battery component carriers are wrapped by the underbody protecting member between the battery system cover and the underbody protecting member.

* * * * *